Patented June 17, 1930

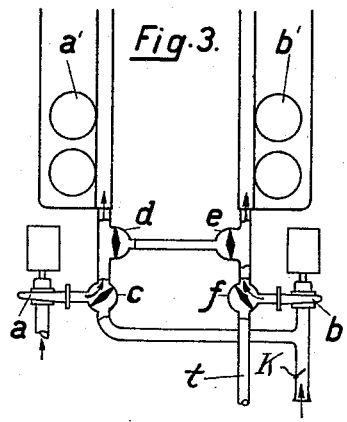
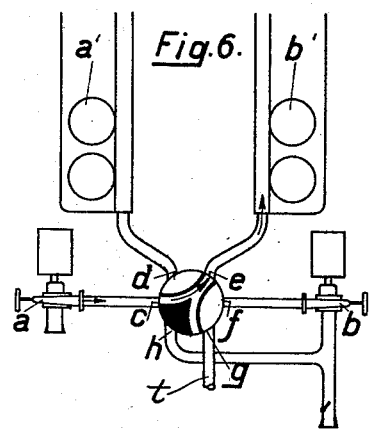
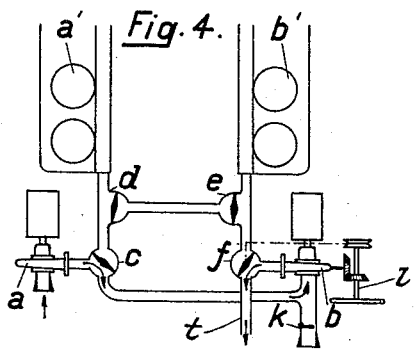
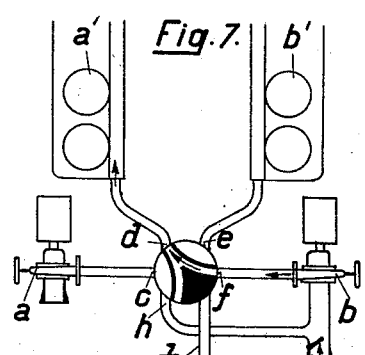
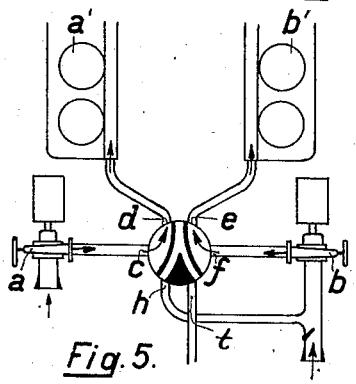
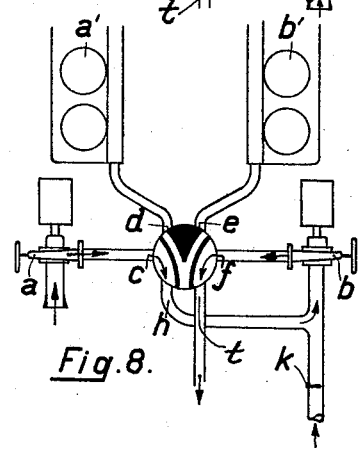

1,763,791

UNITED STATES PATENT OFFICE

EMIL KLINGELFUSS AND ADOLF BAUMANN, OF BADEN, SWITZERLAND, ASSIGNORS TO AKTIENGESELLSCHAFT BROWN, BOVERI AND CIE., OF BADEN, SWITZERLAND

AIR SCAVENGING AND CHARGING BLOWER FOR ENGINES

Application filed February 26, 1925, Serial No. 11,901, and in Switzerland March 15, 1924.

Ships' Diesel engines have recently been furnished as a rule with turbo-blowers for the scavenging of two-stroke cycle engines or for the charging blower of four-stroke cycle engines. This construction requires less space with less weight. In the case of submarines, turbo-blowers are employed further for blowing out the ballast tanks.

The present invention effects a further saving in space and weight, because the same blower is employed for scavenging or charging the engines, as well as for blowing out the tanks. As a rule a submarine is furnished with two Diesel engines having each a scavenging or charging blower. This arrangement allows of connecting the two blowers together in series for working upon the tanks. This manner of working contributes less air, but about twice the pressure required for the scavenging or charging of Diesel engines. It is therefore possible to attain the desired pressure by series-connection of the blowers.

In the accompanying drawings:—

Figure 1:
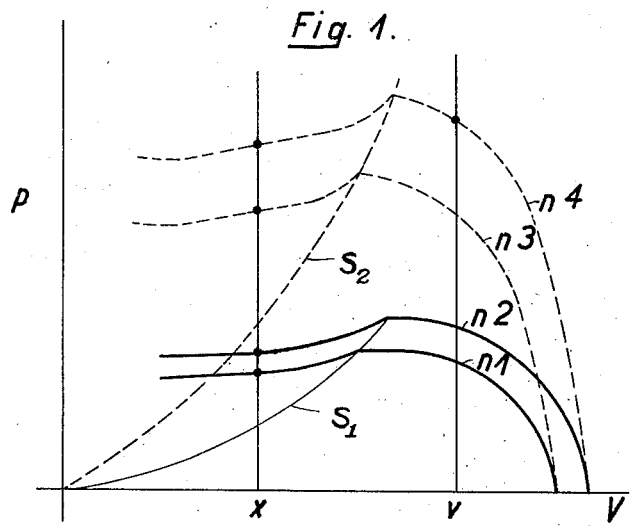

Figure 1 illustrates by way of example the pressure-volume curves of two blowers in the case of series-connection and parallel connection. The full lines show for two speeds of rotation, $n^1$ and $n^2$, the pressure-volume characteristic of one blower alone, whilst the dotted curves $n^3$ and $n^4$ represent the pressure-volume characteristics for the two blowers operating in series-connection. Thus, for instance, in working for air scavenging purposes, each of the two blowers can deliver a volume $v$, that is to say $2v$ for the two together when connected in parallel; and, for blowing out tanks with the blowers connected in series, about half the volume of $v$, that is to say, with special regulation, any desired volume $x$ at double pressure.

Figure 2:
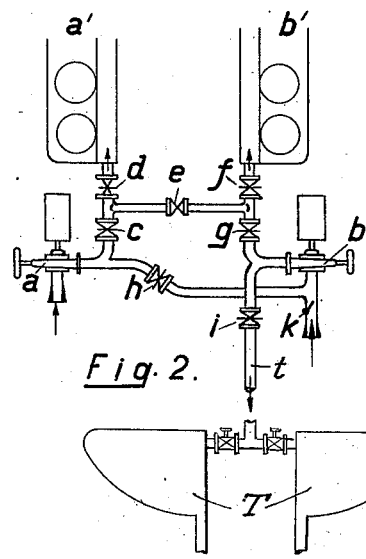

Figure 2 illustrates one arrangement of the apparatus in which the blower $a$ works on the Diesel engine $a'$, whilst the blower $b$ works directly on the Diesel engine $b'$, the cross connecting valves $e$, $h$, and valve $i$ in the air connection $t$ to the ballast tanks T being closed. Valves $c$, $d$, $f$, $g$ are open, as is also the non-return flap valve $k$ in the intake of blower $b$. For blowing out the tanks T, the two blowers $a$ and $b$ are connected in series, and therefore the valves $c$ and $g$ are closed, and the valves $h$ and $i$ are opened, so that the blower $a$ delivers into the blower $b$, so that the non-return flap valve $k$ closes, and blower $b$ delivers into tanks T. With this arrangement it is also possible to work crosswise, as in the case one of the Diesel engines or one of the blower motors being thrown out of operation. With valves $h$ and $g$ closed and $e$ and $f$ open, the blower $a$ can work on the Diesel engine $b'$, or with valves $i$ and $c$ closed and $e$ and $d$ open, the blower $b$ can work on the Diesel engine $a'$.

These various connections require, according to Figure 2 seven slide valves and one non-return flap valve. With special change-over devices it is possible to reduce this number. For example Figures 3 and 4 illustrate the same possibilities of connection with only four change-over flap valves and one non-return flap valve. Figure 3 illustrates the working of the two blowers in parallel on the respective Diesel engines, whilst Figure 4 illustrates the series-connection for blowing out the tanks.

It is even possible to perform all the functions with a single change-over device as illustrated in Figures 5 to 8. With the connection shown in Figure 5 the two Diesel engines are served by the blowers $a$ and $b$ in parallel, the connections to lines $t$ and $h$ being closed. Figure 6 illustrates the valve position for connection of blower $a$ on Diesel engine $b'$, and Figure 7 shows the position for connection of blower $b$ on Diesel engine $a'$, connections between the active blower and lines $t$ and $h$, as well as to the non-working blower in each instance being closed by the single change-over device.

With the setting shown in Figure 8, the blowers work in series on the tank, and the Diesel connections $d$ and $e$ are closed.

For adapting the blowers to the air delivery requirements for working the tanks, the blowers may be provided in the usual manner with the various known regulating devices such as for instance, a speed-regulating device, a relief valve or movable guide blades. As an example of this latter regulation Figure 4 illustrates the linking together of the change-over valve *f* and the actuating gear *l* which controls the movable guide blades of the blower.

What we claim is:—

1. In a power installation, in combination, separate engines, a container, separately driven blowers, means for connecting the respective blowers to serve the engines separately or collectively, and means for connecting the blowers to serve the container in series.

2. In blower apparatus, in combination, separately driven blowers each having an inlet and an outlet, means for connecting the blowers in series, and means operable by the preliminary blower for closing the inlet of the leading blower.

3. In combination, apparatus for utilizing fluid under pressure, a plurality of fluid-pressure supply devices, second apparatus for utilizing fluid under pressure, and means operable to provide for parallel-operation of said devices with respect to the first apparatus to supply the same with fluid under pressure or to provide for series-operation of said devices with respect to the second apparatus to supply the same with fluid under pressure.

4. In combination, internal combustion apparatus utilizing fluid under pressure, a plurality of fluid-pressure supply devices, second apparatus for utilizing fluid under pressure, and means operable to provide for parallel-operation of said devices with respect to the first apparatus to supply the same with fluid under pressure to the exclusion of the second apparatus or to provide for series-operation of said devices with respect to the second apparatus to supply the same with fluid under pressure to the exclusion of the first apparatus.

5. In combination, a plurality of internal combustion engines utilizing fluid under pressure, a plurality of fluid-pressure supply devices, second apparatus for utilizing fluid under pressure, and means operable to provide for selective or parallel-operation of said devices with respect to said engines to supply the same with fluid under pressure to the exclusion of the second apparatus or to provide for series-operation of said devices with respect to the second apparatus to supply the same with fluid under pressure to the exclusion of said engines.

In testimony whereof we have signed our names to this specification.

EMIL KLINGELFUSS.
ADOLF BAUMANN.